(12) United States Patent
Liu et al.

(10) Patent No.: US 10,447,929 B2
(45) Date of Patent: Oct. 15, 2019

(54) VIDEO PROCESSING METHOD, DEVICE AND IMAGE SYSTEM

(71) Applicant: SZ DJI TECHNOLOGY CO., LTD., Shenzhen (CN)

(72) Inventors: Weifeng Liu, Shenzhen (CN); Shunnian Li, Shenzhen (CN); Ye Tao, Shenzhen (CN); Yayun Zheng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 16 days.

(21) Appl. No.: 15/622,327

(22) Filed: Jun. 14, 2017

(65) Prior Publication Data
US 2017/0280058 A1    Sep. 28, 2017

Related U.S. Application Data

(63) Continuation of application No. PCT/CN2014/093787, filed on Dec. 14, 2014.

(51) Int. Cl.
| | |
|---|---|
| *H04N 1/21* | (2006.01) |
| *H04N 5/92* | (2006.01) |
| *H04N 9/82* | (2006.01) |
| *G11B 27/02* | (2006.01) |
| *H04N 5/232* | (2006.01) |

(Continued)

(52) U.S. Cl.
CPC ......... *H04N 5/23267* (2013.01); *B64D 47/08* (2013.01); *G11B 27/02* (2013.01); *H04N 1/2129* (2013.01); *H04N 5/23218* (2018.08); *H04N 5/23222* (2013.01); *H04N 5/2628* (2013.01);

(Continued)

(58) Field of Classification Search
CPC ............. H04N 1/2129; H04N 5/23218; H04N 5/23222; H04N 5/23267; H04N 5/2628; B64D 47/08
See application file for complete search history.

(56) References Cited

U.S. PATENT DOCUMENTS

| | | | | |
|---|---|---|---|---|
| 5,894,323 A | * | 4/1999 | Kain ....................... | G01C 11/02 348/116 |
| 8,908,102 B1 | * | 12/2014 | Crawford ............. | H04N 5/2628 348/699 |

(Continued)

FOREIGN PATENT DOCUMENTS

| | | |
|---|---|---|
| CN | 102509285 A | 6/2012 |
| CN | 103002330 A | 3/2013 |
| CN | 103262169 A | 8/2013 |

OTHER PUBLICATIONS

User Manual VN 200 copyright 2017.*

(Continued)

*Primary Examiner* — Daniel M Pasiewicz
(74) *Attorney, Agent, or Firm* — Anova Law Group, PLLC

(57) ABSTRACT

An image processing method includes, when an edit triggering event for a target image is detected, acquiring description information associated with the target image. The description information includes interference information that affects image quality occurred in a shooting process of the target image. The method further includes editing image clips in the target image which are associated with respective interference information of the description information to obtain a processed target image.

18 Claims, 9 Drawing Sheets

(51) Int. Cl.
*H04N 5/262* (2006.01)
*B64D 47/08* (2006.01)

(52) U.S. Cl.
CPC ....... *H04N 5/23258* (2013.01); *H04N 9/8205* (2013.01)

(56) References Cited

U.S. PATENT DOCUMENTS

| | | | |
|---|---|---|---|
| 9,262,818 B2* | 2/2016 | Giuffrida | H04N 7/185 |
| 9,751,639 B2* | 9/2017 | Dvorak | B64D 47/08 |
| 2002/0039138 A1* | 4/2002 | Edelson | G06T 3/0006 |
| | | | 348/208.99 |
| 2004/0085340 A1* | 5/2004 | Dimitrova | G11B 27/031 |
| | | | 715/723 |
| 2005/0231599 A1 | 10/2005 | Yamasaki | |
| 2009/0066799 A1* | 3/2009 | Whitcombe | H04N 5/23248 |
| | | | 348/208.5 |
| 2009/0213231 A1* | 8/2009 | Kurokawa | H04N 5/23248 |
| | | | 348/208.1 |
| 2011/0280551 A1* | 11/2011 | Sammon | G11B 27/034 |
| | | | 386/289 |
| 2012/0148216 A1* | 6/2012 | Pavagada | G11B 27/02 |
| | | | 386/278 |
| 2014/0267801 A1* | 9/2014 | Grundmann | H04N 5/2329 |
| | | | 348/208.1 |
| 2015/0097950 A1* | 4/2015 | Wang | H04N 5/23287 |
| | | | 348/144 |

OTHER PUBLICATIONS

The World Intellectual Property Organization (WIPO) International Search Report and Written Opinion for PCT/CN2014/093787 dated Jul. 17, 2015 8 Pages.

* cited by examiner

VIDEO PROCESSING METHOD, DEVICE AND IMAGE SYSTEM

CROSS-REFERENCE TO RELATED APPLICATION

This is a continuation application of International Application No. PCT/CN2014/093787, filed on Dec. 14, 2017, the entire contents of which are incorporated herein by reference.

TECHNICAL FIELD

The present disclosure relates to the technical field of image processing, and in particular, to a video processing method and device and an image system.

BACKGROUND

With development of electronic technologies and popularization of various electronic apparatuses with an image capturing function, people can basically shoot images and videos of interest whenever and wherever possible. For the shot images and videos, people can share them with friends or collect them as desired.

During sharing or collection, a user generally hopes to edit the shot images or videos, and the user may edit by adding subtitles and music, and may further cut the videos to remove a picture or a video clip with poor image quality and retain videos with better effects to form a new video for sharing or collection.

There are lots of reasons for the poor image quality, which may specifically include the following ones.

Unsmooth control over an aerial vehicle results in that the aerial vehicle suddenly speeds up and suddenly slows down, and undesired image information of a support or a propeller of the aerial vehicle is easy to appear in an image. Non-uniformly control of the speed of a gimbal and other carrying members used for carrying a camera results in that the images on the camera transitions quickly and the image quality is fuzzy. Occasionally, owing to shaking of the camera caused by an external factor, the image quality is not good.

In the prior art, the user generally edits a collection of pictures or videos shot in a period of time after the collection of pictures or videos are shot. When the user requires an image with good quality, for the collection of pictures, the user, by viewing the pictures one by one, deletes the pictures with poor quality, and screens for qualified pictures. For the videos, the user needs to view and manually delete video clips with poor image quality in the process of browsing the videos through professional video cutting software.

The existing editing manner may require the user to spend lots of time, and in terms of video editing, the operation of editing videos through professional video cutting software is complicated for most users and is not easy to implement.

SUMMARY

Embodiments of the present disclosure provide a video processing method and device and an image system, which can achieve rapid video editing operations based on associated interference information.

In one aspect, the embodiments of the present disclosure provide an image processing method, including:

when an edit triggering event for a target image is detected, acquiring description information associated with the target image, the description information including interference information that affects image quality occurred in a shooting process of the target image; and editing image clips in the target image which are associated with respective interference information of the description information to obtain a processed target image.

Optionally, the target image includes videos or a collection of pictures.

Optionally, the method further includes, before the acquiring description information associated with the target image, recording description information of the target image in a shooting process of the target image.

Optionally, the recording description information of the target image in a shooting process of the target image includes:

in the shooting process of the target image, detecting associated motion data of a shooting module, and generating description information according to the detected associated motion data, the shooting module being used for shooting the target image;

the associated motion data including interference data that affects the quality of the target image, wherein the interference data that affects the quality of the target image includes acceleration data and/or angular acceleration data.

Optionally, the interference data that affects the quality of the target image includes acceleration, and/or angular velocity of a carrying member that carries the shooting module in one or more directions.

Optionally, the interference data that affects the quality of the target image includes acceleration, and/or angular velocity of a moving object that mounts the shooting module in one or more directions.

Optionally, the generating description information according to the detected associated motion data includes, when the detected associated motion data is interference data that affects the quality of the target image, generating interference information, or otherwise, generating smooth information, the interference information and the smooth information forming the description information.

Optionally, the description information generated is a motion indication line, and in the generated motion indication line, the interference information is represented with a curve segment, and the smooth information is represented with a straight line segment.

Optionally, the editing image clips in the target image which are associated with respective interference information of the description information to obtain a processed target image includes:

determining image clips which are associated with respective interference information in the description information; and cutting the target image by deleting the determined image clips to obtain a cut image.

Optionally, the determining image clips which are associated with respective interference information in the description information includes, according to time periods of occurrence of the respective interference information in the description information, determining image clips in the corresponding time periods in the target image.

Optionally, the method further includes:

in the shooting process of the target image, if a selected event of interest from a user is received, adding label information to an image clip in the target image which corresponds to the selected event of interest.

Optionally, the method further includes:

if a configured editing rule indicates editing the target image based on the label information, acquiring an image clip according to the label information added for the target image; and obtaining a new image through editing based on the acquired image clip.

Optionally, the editing image clips in the target image which are associated with respective interference information of the description information to obtain a processed target image includes:

determining image clips which are associated with the respective interference information in the description information and to which label information has not been added; and cutting the target image by deleting the determined image clips to obtain a cut image.

In another aspect, the embodiments of the present disclosure further provide an image processing device, including:

an acquisition module used for, when an edit triggering event for a target image is detected, acquiring description information associated with the target image, the description information including interference information that affects image quality occurred in a shooting process of the target image; and an editing module used for editing image clips in the target image which are associated with respective interference information of the description information to obtain a processed target image.

Optionally, the method further includes a recording module used for recording description information of the target image in the shooting process of the target image.

Optionally, the recording module is specifically used for, in the shooting process of the target image, detecting associated motion data of a shooting module, and generating description information according to the detected associated motion data, the shooting module being used for shooting the target image, the associated motion data including interference data that affects the quality of the target image, wherein the interference data that affects the quality of the target image includes acceleration data and/or angular acceleration data.

Optionally, the interference data that affects the quality of the target image includes acceleration, and/or angular velocity of a carrying member that carries the shooting module in one or more directions.

Optionally, the interference data that affects the quality of the target image includes acceleration, and/or angular velocity of a moving object that mounts the shooting module in one or more directions.

Optionally, the recording module is specifically used for, when the detected associated motion data is interference data that affects the quality of the target image, generating interference information, or otherwise, generating smooth information, the interference information and the smooth information forming the description information.

Optionally, the description information generated by the recording module is a motion indication line, and in the generated motion indication line, the interference information is represented with a curve segment, and the smooth information is represented with a straight line segment.

Optionally, the editing module includes:

a first determination unit used for determining image clips which are associated with respective interference information in the description information; and a first deletion unit used for cutting the target image by deleting the determined image clips to obtain a cut image.

Optionally, the first determination unit is specifically used for, according to time periods of occurrence of the respective interference information in the description information, determining image clips in the corresponding time periods in the target image.

Optionally, the recording module is further used for, in the shooting process of the target image, if a selected event of interest from a user is received, adding label information to an image clip in the target image which corresponds to the selected event of interest.

Optionally, the editing module is further used for, if a configured editing rule indicates editing the target image based on the label information, acquiring an image clip according to the label information added for the target image, and obtaining a new image through editing based on the acquired image clip.

Optionally, the editing module includes:

a second determination unit used for determining image clips which are associated with the respective interference information in the description information and to which label information has not been added; and a second deletion unit used for cutting the target image by deleting the determined image clips to obtain a cut image.

In a further aspect, the embodiments of the present disclosure further provide an image system, including an imaging apparatus and a processor, wherein, the imaging apparatus is used for shooting a target image; and the processor is used for, when an edit triggering event for the target image is detected, acquiring description information associated with the target image, the description information including interference information that affects image quality occurred in a shooting process of the target image, and editing image clips in the target image which are associated with respective interference information of the description information to obtain a processed target image.

Optionally, the processor is further used for recording description information of the target image in the shooting process of the target image.

Optionally, the processor is further used for, in the shooting process of the target image, detecting associated motion data of the imaging apparatus, and generating description information according to the detected associated motion data, the associated motion data including interference data that affects the quality of the target image, wherein the interference data that affects the quality of the target image includes: acceleration data and/or angular acceleration data.

Optionally, the processor is specifically used for, when the detected associated motion data is interference data that affects the quality of the target image, generating interference information, or otherwise, generating smooth information, the interference information and the smooth information forming the description information.

Optionally, the description information generated by the processor is a motion indication line, and in the generated motion indication line, the interference information is represented with a curve segment, and the smooth information is represented with a straight line segment.

Optionally, the processor is specifically used for determining image clips which are associated with respective interference information in the description information, and cutting the target image by deleting the determined image clips to obtain a cut image.

Optionally, the processor is specifically used for, according to time periods of occurrence of the respective interference information in the description information, determining image clips in the corresponding time periods in the target image.

Optionally, the processor is further used for, in the shooting process of the target image, if a selected event of interest from a user is received, adding label information to an image clip in the target image which corresponds to the selected event of interest.

Optionally, the processor is further used for, if a configured editing rule indicates editing the target image based on the label information, acquiring an image clip according to the label information added for the target image, and obtaining a new image through editing based on the acquired image clip.

Optionally, the processor is further used for determining image clips which are associated with the respective interference information in the description information and to which label information has not been added, and cutting the target image by deleting the determined image clips to obtain a cut image.

According to the embodiments of the present disclosure, an image can be automatically edited based on motion information, which requires no complicated operation steps for users, is easy for the users to implement, meets the users' demand for automation and intelligence, and saves the users' time.

DETAILED DESCRIPTION OF THE EMBODIMENTS

The technical solution of the present disclosure will be described in more detail below with reference to the accompanying drawings of the present disclosure. The described embodiments are merely some of the embodiments of the present disclosure rather than all of the embodiments. All other embodiments obtained by a person of ordinary skill in the art based on the embodiments of the present disclosure without creative efforts shall fall within the scope of the present disclosure.

According to the embodiments of the present disclosure, a target image can be automatically edited based on motion information associated with the target image which includes interference information, and image editing can be automatically and intelligently completed for users. For example, video clips or picture sets with poor quality caused by shooting operations of some users are deleted.

Figure 1:
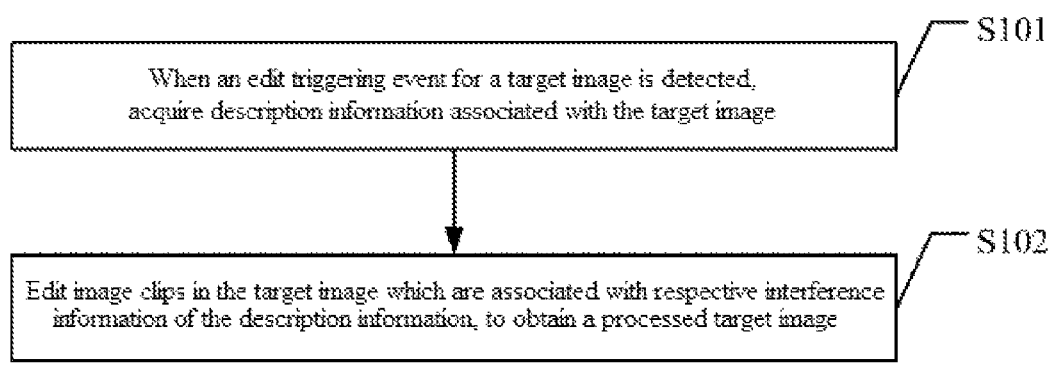
FIG. 1 is a schematic flow chart of one image processing method according to an embodiment of the present disclosure.

Specifically, referring to FIG. 1, it is a schematic flow chart of one image processing method according to an embodiment of the present disclosure. The method according to the embodiment of the present disclosure may be implemented in an image processor, and specifically, the method includes the following steps.

S101: When an edit triggering event for a target image is detected, description information associated with the target image is acquired. The description information includes interference information that affects image quality occurred in a shooting process of the target image.

The description information may specifically be motion related information of an imaging apparatus (for example, various video cameras) that shoots the target image in the shooting process, and situations that lead to occurrence of the interference information include, but are not limited to:

a situation where unsmooth control over a moving object (for example, an aerial vehicle) that mounts the imaging apparatus results in that the moving object suddenly moves quickly and suddenly moves slowly; a situation where the control over a carrying member that carries the imaging apparatus causes the carrying member to rotate in different directions; and a situation where the imaging apparatus shakes occasionally due to an external factor, for example, strong wind and the like. The carrying member may be a gimbal apparatus used for mounting and fixing a camera, and the gimbal apparatus may make the camera rotate in one or more directions, expanding the surveillance range of the camera.

A user can trigger a processing operation on the target image by easily dragging a target image into an edit interface, or by clicking a video edit button and other trigger events. After the edit triggering events for the target image are detected, in S101, it is feasible to first identify and determine an identifier of the target image and then search for stored description information associated with the target image based on the identifier.

The description information includes at least the interference information, and certainly, may also include other related information than the interference information, for example, smooth information used for indicating that the imaging apparatus is moving at a constant speed or is stationary in the shooting process.

The description information is information synchronously generated and stored while the target image is shot. Specifically, it is feasible to obtain the description information by collecting data sensed by various sensors (for example, an acceleration sensor, a gyroscope and the like) configured in the imaging apparatus.

The description information may also be obtained by collecting angular velocity or acceleration (angular acceleration or translational acceleration) of the carrying member that carries the imaging apparatus on three axes X, Y and Z, and may also be obtained by collecting angular velocity or acceleration (angular acceleration or translational acceleration) of the moving object (for example, aerial vehicle) that mounts the camera or the carrying member.

The target image includes videos or a collection of pictures, wherein the collection of pictures mainly refers to a picture set obtained in the case that multiple pictures are continuously shot. Association between the description information and the target image may be identifier-based association. Corresponding description information may be found based on the topic name of the target image, and the topic name refers to the name of a certain video clip or the name of a photo set shot in a certain time period. The association may also be time-based association, and after occurrence time and end time of the target image are determined, it is feasible to find description information of the corresponding time period in the total description information recorded.

In one expression form, the description information may be an indication line used for describing a motion condition. When the shooting module, or the carrying member, or the moving object is moving at a constant speed and stationary, the description information is manifested as a straight line segment, and is manifested as a curve segment after angular velocity or acceleration in a certain direction is produced. The description information acquired in S101 may be any one or more pieces of information in the corresponding description information in the shooting module, the carrying member, or the moving object.

Recording the description information may be triggered at the time when it is detected that the user initiates video shooting, or it may be triggered manually by the user who turns on the recoding, or the recording may be turned on all the time. In the case that the recording the description information is turned on all the time, in S101, it is feasible to, according to time association, intercept description information of a corresponding time period based on a time period of occurrence of a certain video clip or a time period of occurrence of a collection of pictures.

Specifically, the time information involved above may uniquely identify the corresponding description information and the shooting time of the target image.

S102: Image clips in the target image which are associated with respective interference information of the description information are edited to obtain a processed target image.

The editing mainly includes cutting the target image, and according to a time period corresponding to interference information in the description information, an image in the target image in the time period is deleted. That is, clips in the target image which are affected and have poor image quality are deleted while image clips with better image quality are retained, which can thus be synthesized into a new video or a collection of pictures.

Definitely, the editing may also be replicating and combining image clips that are other than those associated with respective interference information in the description information to obtain a new video or a collection of pictures, so that the original videos can be retained.

It can be understood that receiving a user's video record instruction or picture continuously-shot instruction may also serve as an edit triggering event for a currently recorded video or picture (target image). That is to say, while an image is shot, it is feasible to perform S101 to S102, edit a currently shot image based on the acquired description information, and obtain an edited video or picture directly.

According to the embodiment of the present disclosure, a shot image can be automatically edited based on description information. This requires no complicated operation steps for users, is easy for the users to operate and implement, meets the users' demand for automation and intelligence, and saves the users' time.

Figure 2:
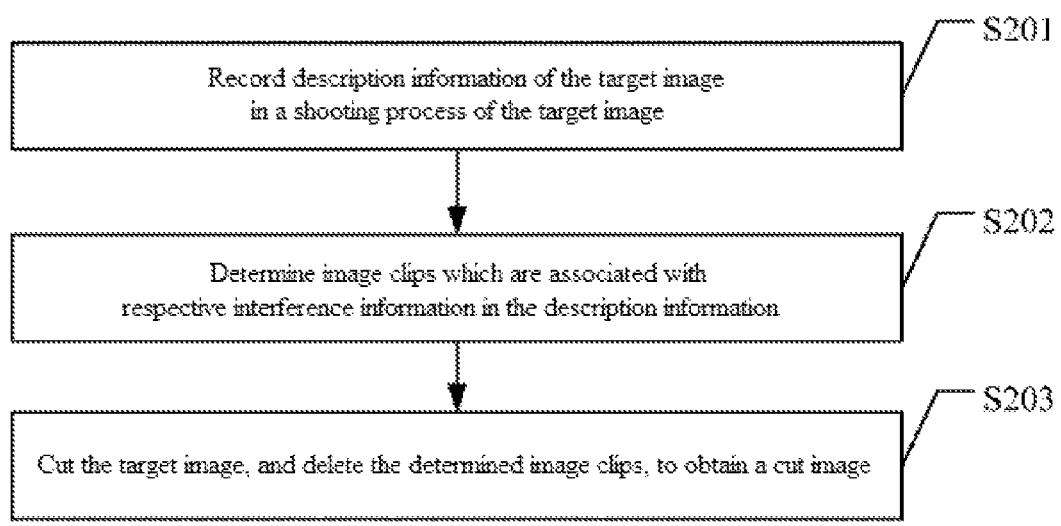
FIG. 2 is a schematic flow chart of another video processing method according to an embodiment of the present disclosure.

Referring to FIG. 2, it is a schematic flow chart of another video processing method according to an embodiment of the present disclosure. The method according to the embodiment of the present disclosure may be implemented in an image processor, and specifically, the method according to the embodiment of the present disclosure includes the following steps.

S201: Description information of the target image is recorded in a shooting process of the target image.

In the embodiment of the present disclosure, S201 may specifically be: in the shooting process of the target image, detecting associated motion data of a shooting module, and generating description information according to the detected associated motion data, the shooting module being used for shooting the target image. The associated motion data includes interference data that affects the quality of the target image, wherein the interference data that affects the quality of the target image includes acceleration data and/or angular acceleration data. The shooting module may specifically be an imaging apparatus.

The description information may specifically be motion related information of an imaging apparatus that shoots the target image in the shooting process, and situations that lead to occurrence of the interference information include, but are not limited to:

a situation where unsmooth control over a moving object (for example, an aerial vehicle) that mounts the imaging apparatus results in that the moving object suddenly moves quickly and suddenly moves slowly; a situation where the control over a carrying member that carries the imaging apparatus causes the carrying member to rotate in different directions; and a situation where the imaging apparatus shakes occasionally due to an external factor, for example, strong wind and the like.

The target image includes videos or a set of pictures. The description information includes at least interference information, and definitely, may also include other related information than the interference information, for example, smooth information used for indicating that the imaging apparatus is moving at a constant speed or is stationary in the shooting process.

The description information is information synchronously generated and stored while the target image is shot. Specifically, it is feasible to obtain the description information by collecting data sensed by various sensors (for example, an acceleration sensor, a gyroscope and the like) configured in the imaging apparatus.

The description information may also be obtained by collecting angular velocity or acceleration of the carrying member that carries the imaging apparatus on three axes X, Y and Z, and may also be obtained by collecting angular velocity or acceleration of the moving object (for example, aerial vehicle) that mounts the camera or the carrying member.

In one expression form, the description information may be an indication line used for describing a motion condition. When the shooting module, or the carrying member, or the moving object is moving at a constant speed and stationary, the description information is manifested as a straight line segment, and is manifested as a curve after angular velocity or acceleration in a certain direction is produced. It is feasible to store, as required, any one or more pieces of information in the corresponding description information in the imaging apparatus used for shooting the target image, the carrying member, or the moving object.

S202: Image clips which are associated with respective interference information in the description information are determined.

S202 may specifically include: according to time periods of occurrence of the respective interference information in the description information, determining image clips in the corresponding time periods in the target image. Specifically, it is feasible to, according to a time period of a motion curve of the carrying member and/or a motion curve of the moving object in the description information, determine a video clip or a picture subset shot in the corresponding time period.

S203: The target image is cut, and the determined image clips are deleted to obtain a cut image.

The determined image clips are deleted, and only video clips or picture subsets not affected by accelerated motion and rotation remain. Specifically, video clips or picture subsets shot by the imaging apparatus in the process of rotation of a carrying member and/or in the process of accelerated motion or rotation of a moving object such as an aerial vehicle are deleted.

According to the embodiment of the present disclosure, a video cutting operation can be performed quickly for users based on description information. This saves the users' time and meets the users' demand for automatically and intelligently cutting a shot image.

Figure 3:
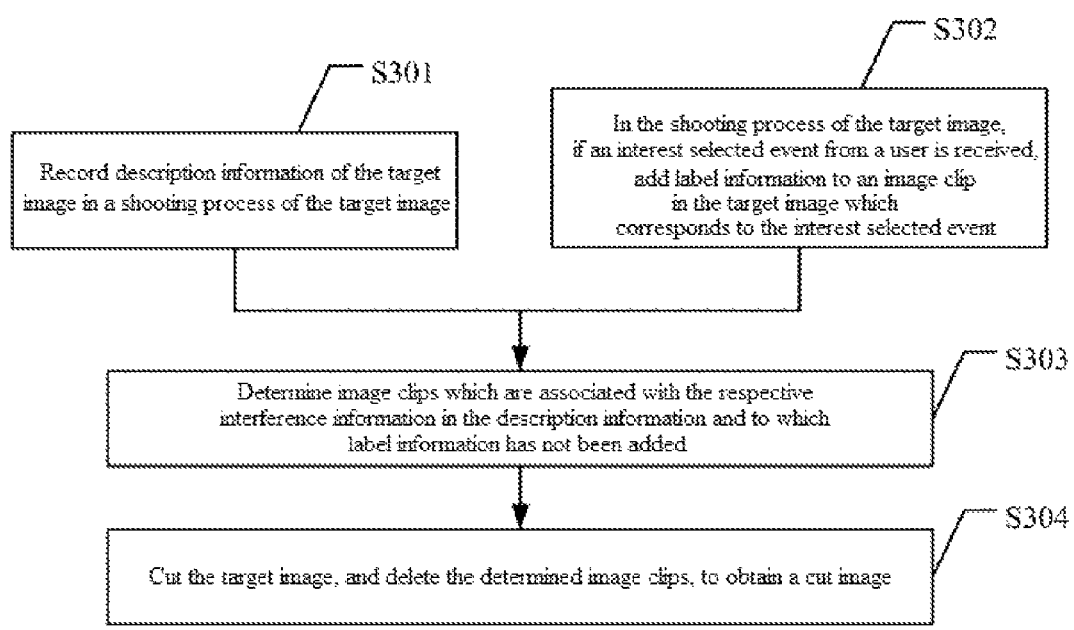
FIG. 3 is a schematic flow chart of a further video processing method according to an embodiment of the present disclosure.

Referring to FIG. 3, it is a schematic flow chart of another video processing method according to an embodiment of the present disclosure. The method according to the embodiment of the present disclosure may be implemented in an image processor, and specifically, the method according to the embodiment of the present disclosure includes the following steps.

S301: Description information of the target image is recorded in the shooting process of the target image.

S301 may specifically include, in the shooting process of the target image, detecting associated motion data of a shooting module, and generating description information according to the detected associated motion data, the shooting module being used for shooting the target image. The associated motion data includes interference data that affects the quality of the target image, wherein the interference data that affects the quality of the target image includes acceleration data and/or angular acceleration data. The shooting module may be an imaging apparatus. Specifically, reference can be made to the description in the previous embodiment for the recording process of S301.

S302: In the shooting process of the target image, if a selected event of interest from a user is received, label information is added to an image clip in the target image which corresponds to the selected event of interest.

In the shooting process of the target image, the user can perform a labeling operation or a rating operation on videos currently shot to indicate how much the user likes the image clip. Specifically, when shooting and recording a certain piece of content, the user, if liking the piece of content, can label the image clip based on a label button or a cut button or the like. Specifically, the user can add a video label through one-click, double-click, long press or other manners.

After the label button is clicked, in S302, an image clip to which label information has been added is obtained, according to a time point of the click, by automatically labeling a 10-second image that has been shot before the time point and a 10-second image to be shot after the time point.

After the label button is double-clicked, in S302, an image clip to which label information has been added is determined automatically according to a time point of the first click and a time point of the second click.

After the label button is long-pressed, in S302, an image clip to which label information has been added is determined automatically according to a time point when the press begins and a time point when the label button is released.

After recording of the description information and the label information is completed, it is feasible to edit image clips in the target image which are associated with respective interference information of the description information to obtain a processed target image, which specifically includes the following S303 to S304.

S303: Image clips which are associated with the respective interference information in the description information and to which label information has not been added are determined.

The determination of corresponding image clips based on description information may specifically include, according to time periods of occurrence of the respective interference information in the description information, determining image clips in the corresponding time periods in the target image. Specifically, it is feasible to, according to a time period of a motion curve of the carrying member and/or a motion curve of the moving object in the description information, determine a video clip or a picture subset shot in the corresponding time period.

The image clips which are associated with interference information in the description information may also have a labeled image clip That is, the quality of the image clip may not be good, but the user likes the image clip, and thus the image clip may not be necessarily deleted.

S304: The target image is cut, and the determined image clips are deleted to obtain a cut image.

The determined image clips are deleted, and only video clips or picture subsets that are not affected and have been labeled remain. Specifically, video clips or picture subsets shot by the imaging apparatus in the process of rotation of a carrying member and/or in the process of accelerated motion or rotation of a moving object such as an aerial vehicle are deleted.

It can be understood that, in S303, it is also feasible to determine the image clips according to a user-configured rule. That is, it is feasible to determine the image clips based only on the interference information, or determine the image clips based jointly on the interference information and the label information, or determine the image clips based only on the label information.

Specifically, in the case of editing after S302 is performed, if a user-configured editing rule is received, it is also feasible to edit images according to the user-configured editing rule, and the method includes: if a configured editing rule indicates editing the target image based on the label information, acquiring an image clip according to the label information added for the target image; and obtaining a new image through editing based on the acquired image clip. If the editing rule is not received, S303 and S304 are performed.

During specific implementation, it is feasible to configure the priority of the editing manner. That is, the priority of the user-configured editing rule is the highest, and when there is a configured editing rule, images are edited according to the user-configured editing rule. Next, when there is user label information, the images are edited according to the description information and the label information. Finally, the images are edited only according to the description information.

According to the embodiment of the present disclosure, a video cutting operation can be performed rapidly for users based on description information and the users' preferences. This saves the users' time and meets the users' demand for automatically and intelligently editing a shot image.

Figure 4:
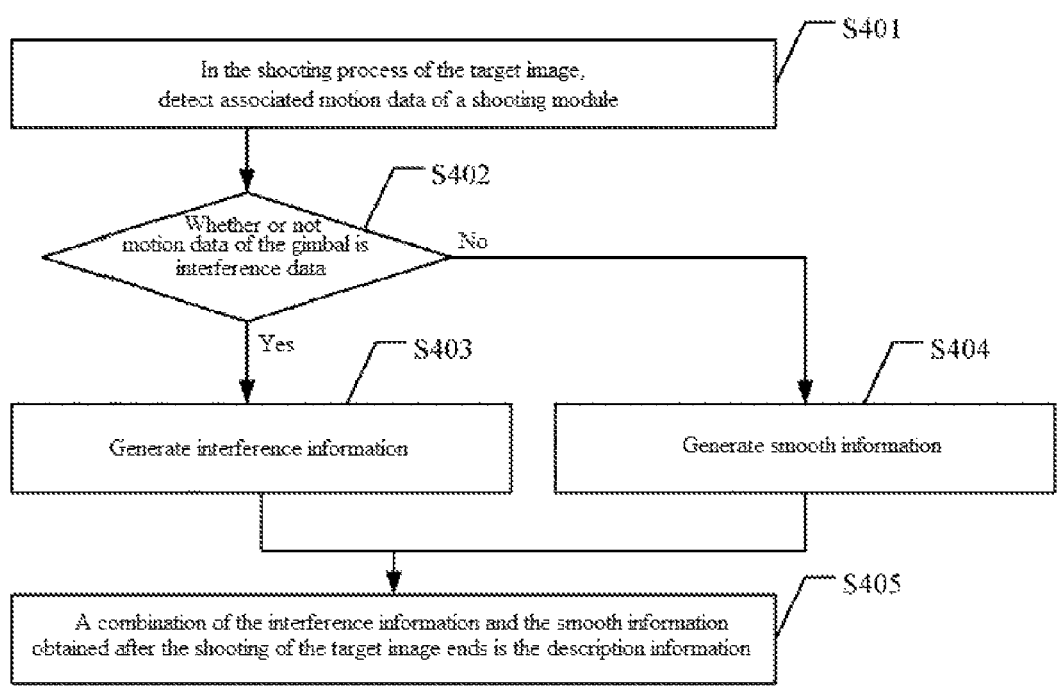
FIG. 4 is a schematic flow chart of a method for recording motion information of a carrying member according to an embodiment of the present disclosure.

Referring to FIG. 4, it is a schematic flow chart of a method for recording motion information of a carrying member according to an embodiment of the present disclosure. The method according to the embodiment of the present disclosure includes the following steps.

S401: In the shooting process of the target image, associated motion data of a shooting module is detected.

The shooting module may be an imaging apparatus. The imaging apparatus may be fixed on a carrying member. In S401, it is feasible to obtain motion data of the carrying member, such as moving velocity, acceleration, and angular velocity, by searching for various motion sensors configured in the carrying member. The motion data of the carrying member is associated motion data of the imaging apparatus, and thus description information associated with the target image is determined.

After the associated motion data, it is feasible to generate description information according to the detected associated motion data, which specifically includes the following S402 to S405.

S402: Whether or not currently detected motion data of the carrying member is interference data that affects the quality of the target image is judged. That is, whether or not the motion data of the carrying member is acceleration, and/or angular velocity of the carrying member in one or more directions is judged. Under normal circumstances, when the carrying member speeds up and rotates, video shooting may be interfered.

S403: If it is interference data, that is, if the detected associated motion data is interference data that affects the quality of the target image, interference information is generated.

S404: Otherwise, smooth information is generated.

S405: A combination of the interference information and the smooth information obtained after the shooting of the target image ends is the description information.

Specifically, it is feasible to generate the description information in the form of an indication line. In the description information, the interference information is represented with a curve segment, and the smooth information is represented with a straight line segment. If other description information also exists, for example, if description information (indication lines) of an aerial vehicle that fixes the carrying member also exists, it is feasible to fit the two indication lines into a line segment that includes a straight line and a curve to indicate description information for the time the imaging apparatus shoots the target image.

Figure 5:
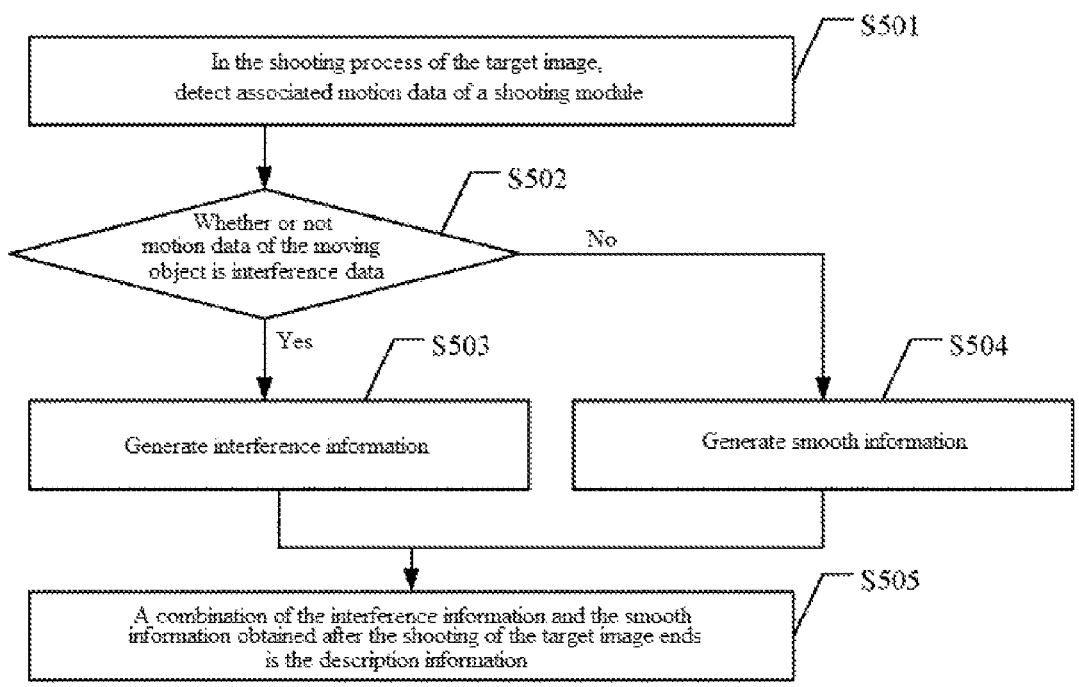
FIG. 5 is a schematic flow chart of a method for recording motion information of a moving object according to an embodiment of the present disclosure.

Referring to FIG. 5, it is a schematic flow chart of a method for recording description information of a moving object according to an embodiment of the present disclosure. The method including the following steps.

S501: In the shooting process of the target image, associated motion data of a shooting module is detected.

The shooting module may be an imaging apparatus, and the imaging apparatus is mounted on the moving object or is mounted on the moving object through a carrying member. In S501, it is feasible to, by searching for various motion sensors configured in a moving object (for example, aerial vehicle), obtain motion data of the moving object, such as moving velocity, acceleration, and angular velocity. The motion data of the moving object is associated motion data of the imaging apparatus, and thus description information associated with the target image is determined.

After the motion data of the moving object is obtained, it is feasible to generate description information according to the detected associated motion data. The shooting module is used for shooting the target image, and the implementation of the following S502 to S505 is specifically included.

S502: Whether or not the detected motion data of the moving object is interference data that affects the quality of the target image is judged. The interference data that affects the quality of the target image includes acceleration data and/or angular acceleration data.

S503: If it is interference data, that is, if the detected associated motion data is interference data that affects the quality of the target image, interference information is generated.

S504: Otherwise, smooth information is generated.

S505: A combination of the interference information and the smooth information obtained after the shooting of the target image ends is the description information.

Specifically, it is feasible to generate the description information in the form of an indication line. In the description information, the interference information is represented with a curve segment, and the smooth information is represented with a straight line segment. If other description information also exists, for example, if description information (indication lines) of a carrying member also exists, it is feasible to fit the two indication lines into a line segment that includes a straight line and a curve to indicate description information for the time the imaging apparatus shoots the target image.

Under normal circumstances, the carrying member and the moving object both have a variety of motion sensors. Especially for aerial vehicles used for aerial shoot, remote control cars and the like, it is necessary to detect moving conditions of corresponding moving objects through an accelerometer, a gyroscope or other motion sensors. Therefore, description information in the shooting process of the imaging apparatus is determined in the manner shown in FIG. 4 and FIG. 5, and it is feasible by only adding a new function on the basis of the existing hardware, which may not cause any additional hardware cost.

A video processing device and an image system according to embodiments of the present disclosure are described below in detail.

Figure 6:
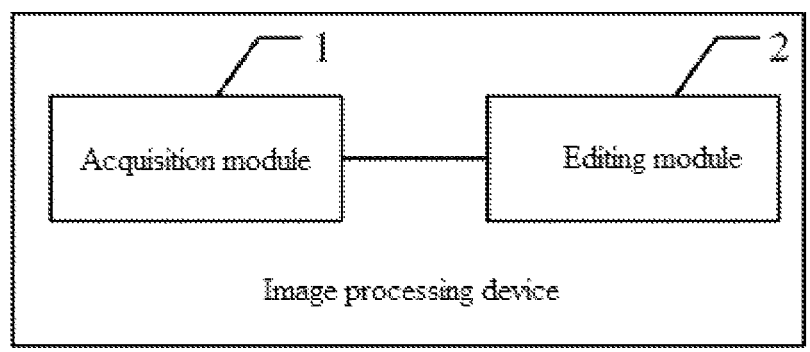
FIG. 6 is a schematic structural diagram of one image processing device according to an Embodiment of the present disclosure.

Referring to FIG. 6, it is a schematic structural diagram of one image processing device according to an embodiment of the present disclosure. The device according to the embodiment of the present disclosure may be configured in various image systems, and specifically, the device includes the following components.

Included is an acquisition module 1 used for, when an edit triggering event for a target image is detected, acquiring description information associated with the target image. The description information includes interference information that affects image quality occurred in a shooting process of the target image.

Also included is an editing module 2 used for editing image clips in the target image. The editing image clips are associated with respective interference information of the description information to obtain a processed target image.

The description information acquired by the acquisition module 1 may specifically be motion related information of an imaging apparatus that shoots the target image in the shooting process, and situations that lead to occurrence of the interference information include, but are not limited to:

a situation where unsmooth control over a moving object (for example, an aerial vehicle) that mounts the imaging apparatus results in that the moving object suddenly moves quickly and suddenly moves slowly; a situation where the control over a carrying member that carries the imaging apparatus causes the carrying member to rotate in different directions; and a situation where the imaging apparatus shakes occasionally due to an external factor, for example, strong wind and the like.

A user can trigger an edit triggering event for the target image by easily dragging a target image into an edit interface, or by clicking a video edit button. After the edit triggering events for the target image are detected, the acquisition module 1 can first identify and determine an identifier of the target image and then search for stored description information associated with the target image based on the identifier.

The description information includes at least the interference information, and certainly, may also include other related information than the interference information, for example, smooth information used for indicating that the imaging apparatus is moving at a constant speed or is stationary in the shooting process.

The description information is information synchronously generated and stored while the target image is shot. Specifically, it is feasible to obtain the description information by collecting data sensed by various sensors (for example, an acceleration sensor, a gyroscope and the like) configured in the imaging apparatus.

The description information may also be obtained by collecting angular velocity or acceleration of the carrying member that carries the imaging apparatus on three axes X, Y and Z, and may also be obtained by collecting angular velocity or acceleration of the moving object (for example, aerial vehicle) that mounts the camera or the carrying member.

The target image includes videos or a collection of pictures, wherein the collection of pictures mainly refers to a picture set obtained in the case that multiple pictures are continuously shot. Association between the description information and the target image may be identifier-based association. The acquisition module 1 can find corresponding description information based on the topic name of the target image, and the topic name refers to the name of a certain video clip or the name of a photo set shot in a certain time period. The association may also be time-based association, and after occurrence time and end time of the target image are determined, the acquisition module 1 can find description information of the corresponding time period in the total description information recorded.

In one expression form, the description information may be an indication line used for describing a motion condition. When the shooting module, or the carrying member, or the moving object is moving at a constant speed and stationary, the description information is manifested as a straight line segment, and is manifested as a curve segment after angular velocity or acceleration in a certain direction is produced. The description information acquired by the acquisition module 1 may be any one or more pieces of information in the corresponding description information in the shooting module, the carrying member, or the moving object.

Recording the description information may be triggered at the time when it is detected that the user initiates video shooting, or it may be triggered manually by the user who turns on the recording, or the recording may be turned on all the time.

Specifically, the time information involved above may uniquely identify the corresponding description information and the shooting time of the target image.

The editing operation of the editing module 2 mainly includes cutting the target image, and according to a time period corresponding to interference information in the description information, deleting an image in the target image in the time period. That is, clips in the target image which are affected and have poor image quality are deleted while image clips with better image quality are retained, which can thus be synthesized into a new video or a collection of pictures.

Definitely, the editing operation of the editing module 2 may also be replicating and combining image clips that are other than those associated with respective interference information in the description information to obtain a new video or a collection of pictures, so that the original videos can be retained.

According to the embodiment of the present disclosure, an image can be automatically edited based on description information. This requires no complicated operation steps for users, is easy to implement, meets the users' demand for automation and intelligence, and saves the time cost.

Figure 7:
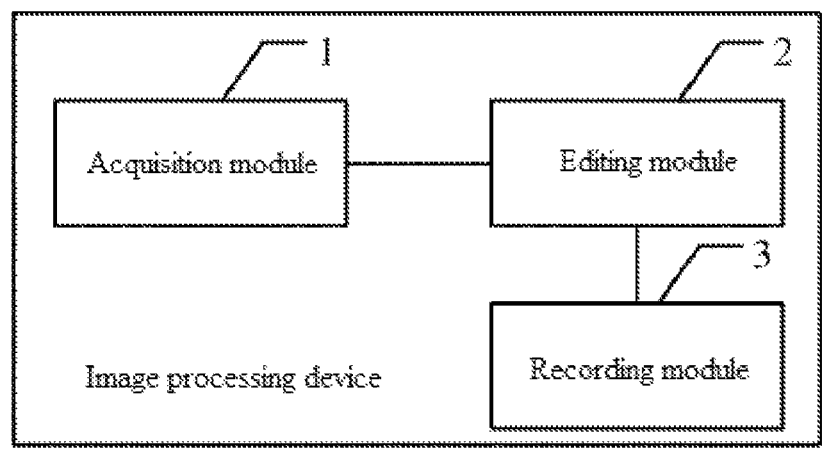
FIG. 7 is a schematic structural diagram of another image processing device according to an embodiment of the present disclosure.

Referring to FIG. 7, it is a schematic structural diagram of another image processing device according to an embodiment of the present disclosure. The device according to the embodiment of the present disclosure may be configured in various image systems. The device includes the acquisition module 1 and the editing module 2 in the above embodiment, and in the embodiment of the present disclosure, the device may further include the following component.

Included is a recording module 3 used for recording description information of the target image in the shooting process of the target image.

Optionally, the recording module 3 is specifically used for, in the shooting process of the target image, detecting associated motion data of a shooting module, and generating description information according to the detected associated motion data, the shooting module being used for shooting the target image. The associated motion data includes interference data that affects the quality of the target image, wherein the interference data that affects the quality of the target image includes acceleration data and/or angular acceleration data.

The interference data that affects the quality of the target image may include acceleration, and/or angular velocity of a carrying member that carries the shooting module in one or more directions.

The interference data that affects the quality of the target image may also include acceleration, and/or angular velocity of a moving object that mounts the shooting module in one or more directions.

The recording module 3 is specifically used for, when the detected associated motion data is interference data that affects the quality of the target image, generating interference information, or otherwise, generating smooth information. The interference information and the smooth information forms the description information.

Specifically, in the embodiment of the present disclosure, the description information generated by the recording module 3 is a motion indication line. In the generated motion indication line, the interference information is represented with a curve segment, and the smooth information is represented with a straight line segment.

Figure 8:
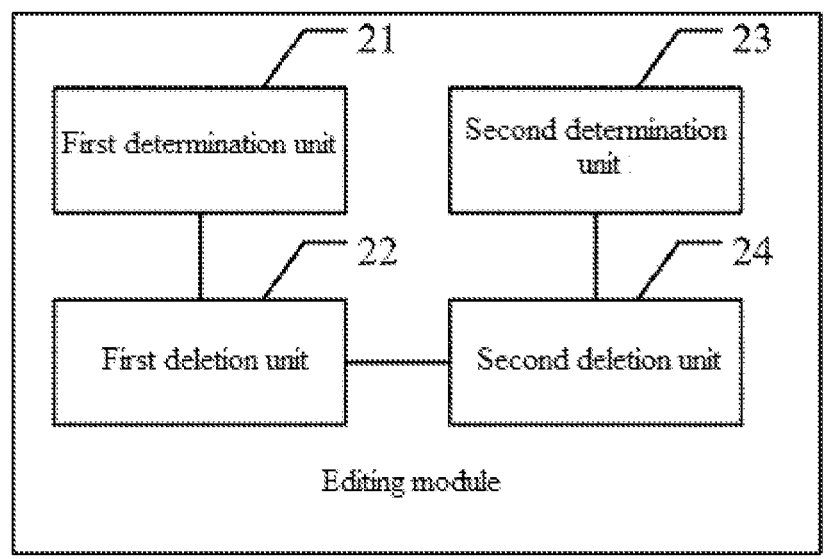
FIG. 8 is one schematic structural diagram of the editing module in FIG. 7.
Figure 9:
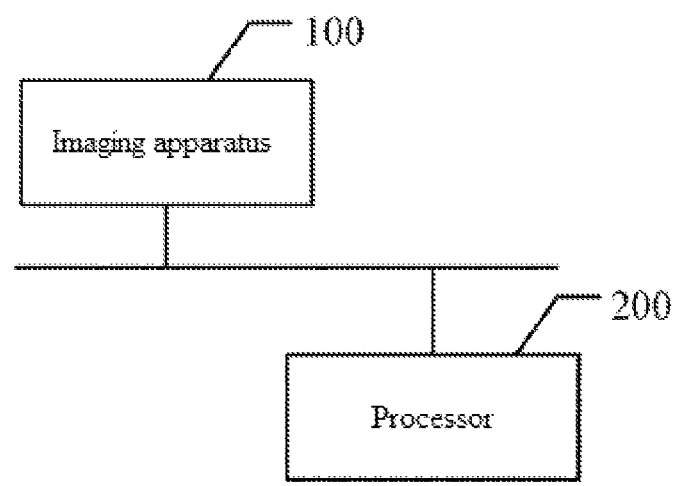
FIG. 9 is a schematic structural diagram of an image system according to an embodiment of the present disclosure.

Further optionally, as shown in FIG. 8, the editing module 2 may specifically include the following components.

Included is a first determination unit 21 used for determining image clips which are associated with respective interference information in the description information.

Also included is a first deletion unit 22 used for cutting the target image by deleting the determined image clips to obtain a cut image.

Specifically, the first determination unit 21 is specifically used for, according to time periods of occurrence of the respective interference information in the description information, determining image clips in the corresponding time periods in the target image.

Further, optionally, the recording module 3 is further used for, in the shooting process of the target image, if a selected event of interest from a user is received, adding label information to an image clip in the target image which corresponds to the selected event of interest.

Further, optionally, the editing module 2 is further used for, if a configured editing rule indicates editing the target image based on the label information, acquiring an image clip according to the label information added for the target image, and obtaining a new image through editing based on the acquired image clip.

Further, optionally, as shown in FIG. 8, the editing module 2 includes the following components.

Included is a second determination unit 23 used for determining image clips which are associated with the respective interference information in the description information and to which label information has not been added.

Also included is a second deletion unit 24 used for cutting the target image by deleting the determined image clips to obtain a cut image.

During a specific application, the editing module 2 can edit images according to a user-configured editing rule, and if the editing rule indicates editing the images based on the label information, the editing module directly acquires an image clip according to the label information added for the target image and obtains a new image through editing based on the acquired image clip. If the editing rule indicates editing the images based on the interference information and the label information, a new image is obtained through the second determination unit 23 and the second deletion unit 24 described above. If the editing rule indicates editing the images based on the interference information, or there is not a configured editing rule, a new image is obtained through the first determination unit 21 and the first deletion unit 22 described above.

Specifically, it is feasible to configure the priority. That is, the priority of the user-configured editing rule is the highest, and when there is a configured editing rule, images are edited according to the user-configured editing rule. Next, when there is user label information, the images are edited according to the description information and the label information Finally, the images are edited only according to the description information.

Specifically, the editing module 2 may include a combination 22 of the first determination unit 1 and the first deletion unit and a combination of the second determination unit 23 and the second deletion unit 24 at the same time. Specifically, it is feasible to select a combination according to user configuration, and it is also feasible to include only one of the combinations.

It should be noted that further reference can be made to the description of the related steps in the above method embodiments for specific implementation of the modules and units involved in the embodiments of the present disclosure.

According to an embodiment of the present disclosure, a video cutting operation can be performed rapidly for users based on description information. This saves the users' time and meets the users' demand for automatically and intelligently editing a shot image.

Referring to FIG. 10, it is a schematic structural diagram of an image system according to an embodiment of the present disclosure. The image system according to the embodiment of the present disclosure may be configured in an aerial vehicle for aerial shoot, a remote control robot and other devices. Specifically, the system includes an imaging apparatus 100 and a processor 200.

The imaging apparatus 100 is used for shooting a target image.

The processor 200 is used for, when an edit triggering event for the target image is detected, acquiring description information associated with the target image, the description information including interference information that affects image quality occurred in a shooting process of the target image, and editing image clips in the target image which are associated with respective interference information of the description information to obtain a processed target image.

Optionally, the target image includes videos or a collection of pictures.

Optionally, the processor 200 is further used for recording description information of the target image in the shooting process of the target image.

Optionally, the processor 200 is specifically used for, in the shooting process of the target image, detecting associated motion data of the imaging apparatus 100, and generating description information according to the detected associated motion data. The associated motion data includes interference data that affects the quality of the target image, wherein the interference data that affects the quality of the target image includes acceleration data and/or angular acceleration data.

Optionally, the processor 200 is specifically used for, in the shooting process of the target image, detecting motion data of a carrying member that carries the imaging apparatus 100 to obtain associated motion data of the imaging apparatus 100. The associated motion data has interference data that affects the quality of the target image, and the interference data that affects the quality of the target image includes acceleration and/or angular velocity of the carrying member in one or more directions.

Optionally, the processor 200 is further used for, in the shooting process of the target image, detecting motion data of a moving object that mounts the imaging apparatus 100 to obtain associated motion data of the imaging apparatus 100. The associated motion data has interference data that affects the quality of the target image, and the interference data that affects the quality of the target image includes acceleration and/or angular velocity of the moving object in one or more directions.

Optionally, the processor 200 is specifically used for determining image clips which are associated with respective interference information in the description information, cutting the target image by deleting the determined image clips to obtain a cut image.

Optionally, the processor 200 is specifically used for, according to time periods of occurrence of the respective interference information in the description information, determining image clips in the corresponding time periods in the target image.

Optionally, the processor 200 is further used for, in the shooting process of the target image, if a selected event from a user is received, adding label information to an image clip in the target image which corresponds to the selected event of interest.

Optionally, the processor 200 is further used for, if a configured editing rule indicates editing the target image based on the label information, acquiring an image clip according to the label information added for the target image, and obtaining a new image through editing based on the acquired image clip.

Optionally, the processor 200 is further used for determining image clips which are associated with the respective interference information in the description information and to which label information has not been added, cutting the target image by deleting the determined image clips to obtain a cut image.

It should be noted that reference can be made to the description of the related steps, functional modules and units in the above method and device embodiments for specific implementation of the processor 200 according to the embodiments of the present disclosure.

According to an embodiment of the present disclosure, a video cutting operation can be performed rapidly for users based on description information. This saves the users' time and meets the users' demand for automatically and intelligently editing a shot image.

In the several embodiments provided in the present disclosure, it should be understood that the related devices and methods disclosed may be implemented in another manner. For example, the device embodiments described above are merely schematic, for example, division of the modules or units may be division of logical functions, and division in another manner may exist in actual implementation. For example, a plurality of units or assemblies may be combined or integrated to another system, or some features may be omitted or not performed. In addition, the mutual coupling or direct coupling or communication connections displayed or discussed may be implemented by using some interfaces, and the indirect coupling or communication connections between the devices or units may be electrical, mechanical or in another form.

The units described as separate components may be or may not be physically separate, and components displayed as units may be or may not be physical units, may be located in one position, or may be distributed on a plurality of network units. Some or all of the units may be selected according to actual needs to achieve the objective of the solution of the embodiment.

In addition, functional units in the embodiments of the present disclosure may be integrated into one processing unit, or each of the units may exist alone physically, or two or more units may be integrated into one unit. The aforementioned integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such understanding, the technical solutions of the present disclosure essentially, or the part that makes contributions to the prior art, or all or a part of the technical solutions may be implemented in a form of a software product. The computer software product is stored in a storage medium, and includes several instructions used for causing a computer processor to perform all or a part of the steps of the methods described in the embodiments of the present disclosure. The foregoing storage medium includes any medium that can store a program code, such as a USB flash drive, a portable hard disk, a Read-Only Memory (ROM), a Random Access Memory (RAM), a magnetic disk, or an optical disc.

The above are merely descriptions of exemplary embodiments of the present disclosure, and are not intended to limit the scope of the present disclosure. Any equivalent structure or equivalent process variation made by using contents of the specification and the drawings of the present disclosure, or directly or indirectly applied to other related technical fields, should be likewise included in the scope of the present disclosure.

What is claimed is:

1. An image processing method, comprising:
   during a shooting process of acquiring a target image by a shooting module, recording motion data associated with the target image, the motion data comprising angular velocity in one or more directions of a gimbal apparatus that carries the shooting module and is configured to rotate the shooting module in the one or more directions, and acceleration in one or more directions of a moving object on which the gimbal apparatus is mounted;
   generating description information associated with the target image according to the motion data associated with the target image; and
   editing image clips in the target image which are associated with respective interference information of the description information to obtain a processed target image.

2. The method according to claim 1, wherein the generating the description information according to the motion data comprises:
   when the motion data includes interference data that affects quality of the target image, generating interference information, or
   when the motion data does not include the interference data that affects the quality of the target image, generating smooth information,
   wherein the interference information and the smooth information form the description information.

3. The method according to claim 2, wherein the description information includes a motion indication line, which includes a curve segment representing the interference information and a straight line segment representing the smooth information.

4. The method according to claim 1, further comprising:
   in the shooting process of the target image, if a selected event of interest from a user is received, adding label information to an image clip in the target image that corresponds to the selected event of interest.

5. The method according to claim 4, further comprising:
   if a configured editing rule indicates to edit the target image based on the label information, acquiring an image clip according to the label information added for the target image; and
   editing the acquired image clip to obtain a new image.

6. The method according to claim 4, wherein editing the image clips in the target image which are associated with the respective interference information of the description information to obtain the processed target image comprises:
   determining image clips which are associated with the respective interference information in the description information and to which no label information is added; and
   cutting the target image by deleting the determined image clips to obtain a cut image.

7. The method according to claim 6, wherein determining the image clips which are associated with the respective interference information in the description information comprises:

according to time periods of occurrence of the respective interference information in the description information, determining image clips in corresponding time periods in the target image.

8. An image system, comprising:

an imaging apparatus configured to shoot a target image; and a processor configured to:
during a shooting process of acquiring the target image, record motion data associated with the target image, the motion data comprising angular velocity in one or more directions of a gimbal apparatus that carries the imaging apparatus and is configured to rotate the imaging apparatus in the one or more directions, and acceleration in one or more directions of a moving object on which the gimbal apparatus is mounted;
generate description information associated with the target image according to the motion data associated with the target image, and
edit image clips in the target image which are associated with respective interference information of the description information to obtain a processed target image.

9. The system according to claim 8, wherein the processor is further configured to:
when the motion data includes interference data that affects the quality of the target image, generate interference information, or
when the motion data does not include the interference data that affects the quality of the target image, generate smooth information,
wherein the interference information and the smooth information form the description information.

10. The system according to claim 9, wherein the description information generated by the processor includes a motion indication line, which includes a curve segment representing the interference information and a straight line segment representing the smooth information.

11. The system according to claim 8, wherein the processor is further configured to, in the shooting process of the target image, if a selected event of interest from a user is received, add label information to an image clip in the target image that corresponds to the selected event of interest.

12. The system according to claim 11, wherein the processor is further configured to, if a configured editing rule indicates to edit the target image based on the label information, acquire an image clip according to the label information added for the target image, and edit the acquired image clip to obtain a new image.

13. The system according to claim 11, wherein the processor is configured to:
determine image clips which are associated with the respective interference information in the description information and to which no label information is added, and
cut the target image by deleting the determined image clips to obtain a cut image.

14. The system according to claim 13, wherein:
the processor is further configured to, according to time periods of occurrence of the respective interference information in the description information, determine image clips in corresponding time periods in the target image.

15. The method according to claim 1, wherein the moving object is an aerial vehicle.

16. The method according to claim 15, wherein the description information includes a first motion indication line indicating the motion data associated with the aerial vehicle and a second motion indication line indicating the motion data associated with the gimbal apparatus.

17. The image system according to claim 8, wherein the moving object is an aerial vehicle.

18. The image system according to claim 17, wherein the description information includes a first motion indication line indicating the motion data associated with the aerial vehicle and a second motion indication line indicating the motion data associated with the gimbal apparatus.

* * * * *